(12) United States Patent
Peng et al.

(10) Patent No.: US 12,319,409 B1
(45) Date of Patent: Jun. 3, 2025

(54) LIGHTWEIGHT MODULAR PAYLOAD DISPENSER

(71) Applicants: Timothy L. Peng, Alexandria, VA (US); Ian T. Shafer, LaPlata, MD (US)

(72) Inventors: Timothy L. Peng, Alexandria, VA (US); Ian T. Shafer, LaPlata, MD (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 9 days.

(21) Appl. No.: 18/522,992

(22) Filed: Nov. 29, 2023

(51) Int. Cl.
B64D 1/06 (2006.01)

(52) U.S. Cl.
CPC ...................... B64D 1/06 (2013.01)

(58) Field of Classification Search
CPC ....................................................... B64D 1/06
See application file for complete search history.

(56) References Cited

U.S. PATENT DOCUMENTS

| | | | | | |
|---|---|---|---|---|---|
| 2,820,397 | A | * | 1/1958 | Durkin | B64D 7/08 89/1.51 |
| 3,584,581 | A | * | 6/1971 | Flatau | F42B 12/58 102/393 |
| 3,987,966 | A | * | 10/1976 | Ruda | F42B 12/70 222/410 |
| 2018/0281952 | A1 | * | 10/2018 | Lewendon | B64D 7/08 |

FOREIGN PATENT DOCUMENTS

CN          109539889 A   *   3/2019

* cited by examiner

*Primary Examiner* — Justin M Benedik
(74) *Attorney, Agent, or Firm* — Edward M. Bushard

(57) ABSTRACT

An apparatus that includes a munitions dispenser comprising a plurality of flicker assemblies. The flicker assemblies include a flicker arm and a guide wall arranged in a circular pattern.

11 Claims, 7 Drawing Sheets

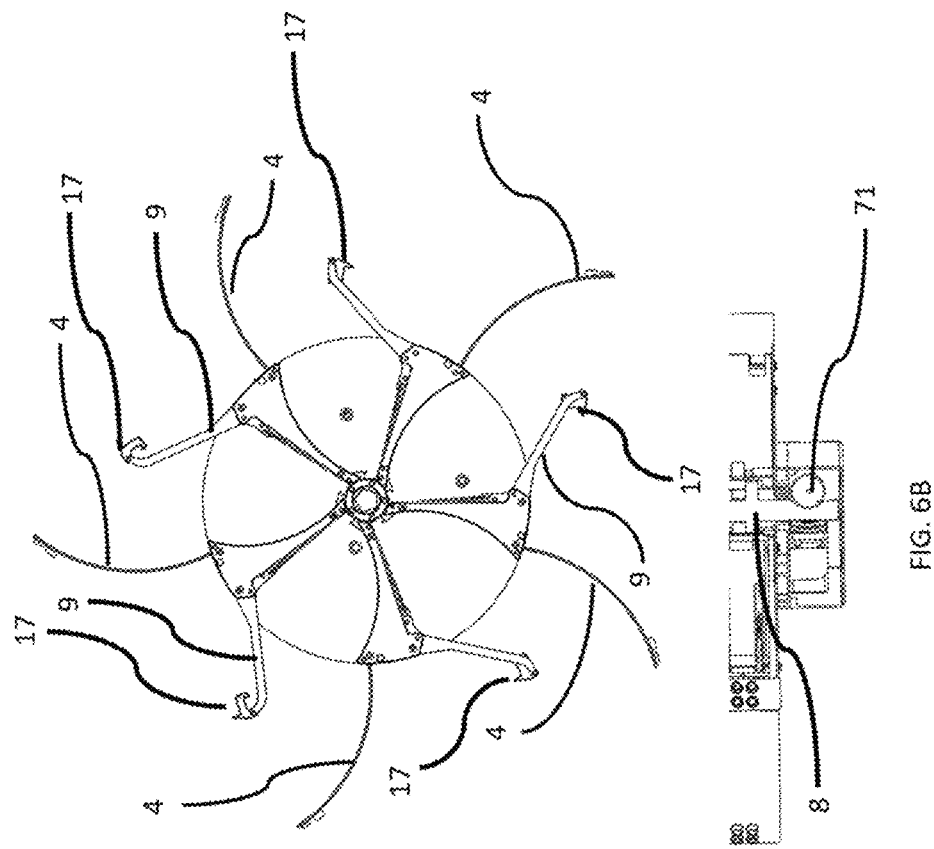
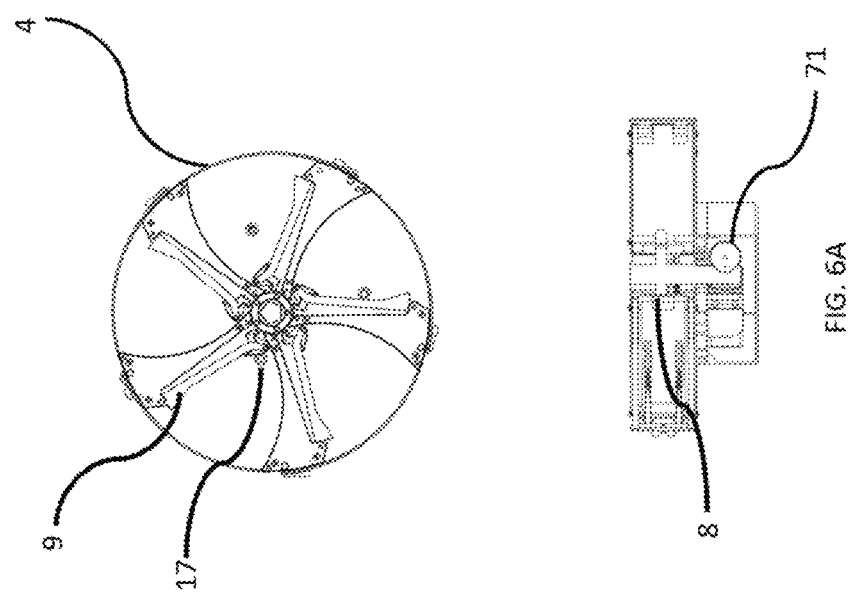
FIG. 6B
FIG. 6A

LIGHTWEIGHT MODULAR PAYLOAD DISPENSER

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to a weapon system. In particular, a lightweight modular payload dispenser.

SUMMARY

The present disclosure relates, in various embodiments, to a modular payload dispenser is to dispense a small payload in a toroidal radius from an aerial vehicle such as an aircraft or a Unmanned Aerial System (UAS). The system is designed to be lightweight, primarily constructed using additive manufacturing, and include a mechanical method of energy storage, such as a spring, such that potential energy may be stored for long periods of time.

Disclosed herein is a modular payload system comprising: a munitions dispenser that includes a plurality of flicker assemblies. The flicker assemblies include a flicker arm, and a guide wall such that the plurality of flicker assemblies are arranged in a circular pattern. In some embodiments, the flicker arm rotates about a center of rotation proximate an outer circumference of the munitions dispenser. In some embodiments, the guide wall comprises an arc such that a first end a second flicker arm distal to the center of rotation moves along the arc. In some embodiments, the flicker assemblies include a door hingibly attached at a first end to the guide, and a latch at a second end of the door. In some embodiments, the latch includes a bipolar magnetic latch comprising a first and second magnet pair, such that the first magnetic pair is arranged to magnetically repel each other and the second magnetic pair is arranged to magnetically attract each other. In some embodiments, the munitions dispenser includes a servo motor, a plurality of sear latches, a pawl, such that the servo motor moves the plurality of sear latches to release the pawl such that the doors of each flicker assembly to be opened sequentially. In some embodiments, the servo motor moves the plurality of sear latches to release the pawl such that the doors of each flicker assembly to be opened simultaneously. In some embodiments, the flicker assembly includes at least one spring attached to the flicker arm and the guide wall. In some embodiments, the apparatus includes a plurality of munitions dispensers stacked such that they are controlled by the servo motor. In some embodiments, each flicker arm works jointly with the guide wall of a corresponding flicker assembly to disperse a munition in a partial toroidal pattern such that the munitions dispenser disperses the munition in a toroidal pattern. In some embodiments, the the magnetic force of the first magnetic pair is weaker than the attracting magnetic force of the second magnetic pair.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 6A-B show the munitions dispenser in the armed position (6A) and in the dispensed position (6B).

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
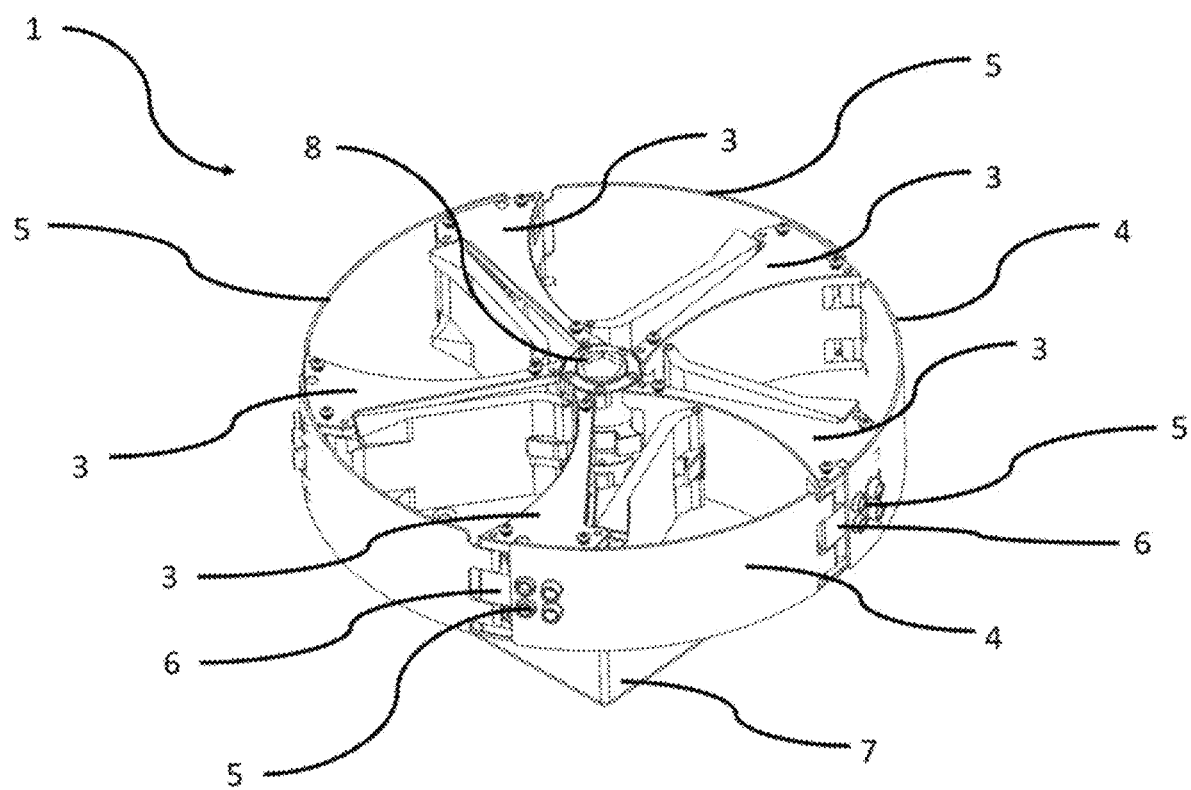
FIG. 1 shows a munitions dispenser.

FIG. 1 shows a munitions dispenser 1. In the embodiment shown, the munitions dispenser 1 includes five flicker assemblies 3, a door 4 with a latch 5 and hinge 6 associated with each flicker assembly, an electronics unit 7, and a sear latch assembly 8. As shown in this view, the flicker assemblies are arranged in a circular pattern.

Figure 2:
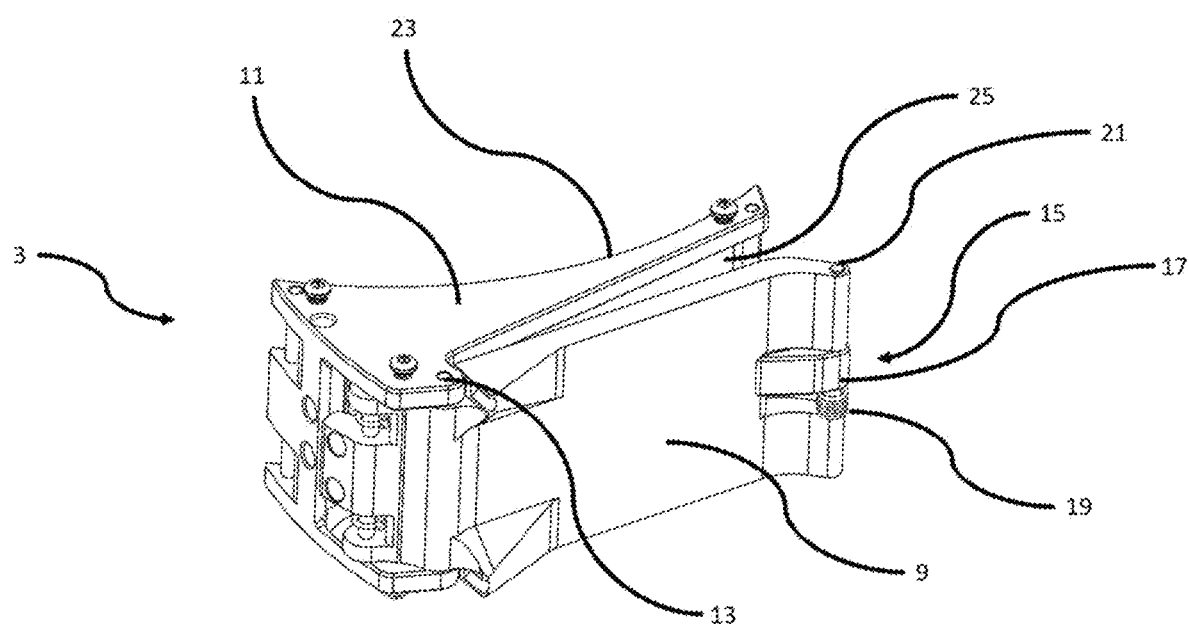
FIGS. 2-3 show detailed views of a flicker assembly.
Figure 3:
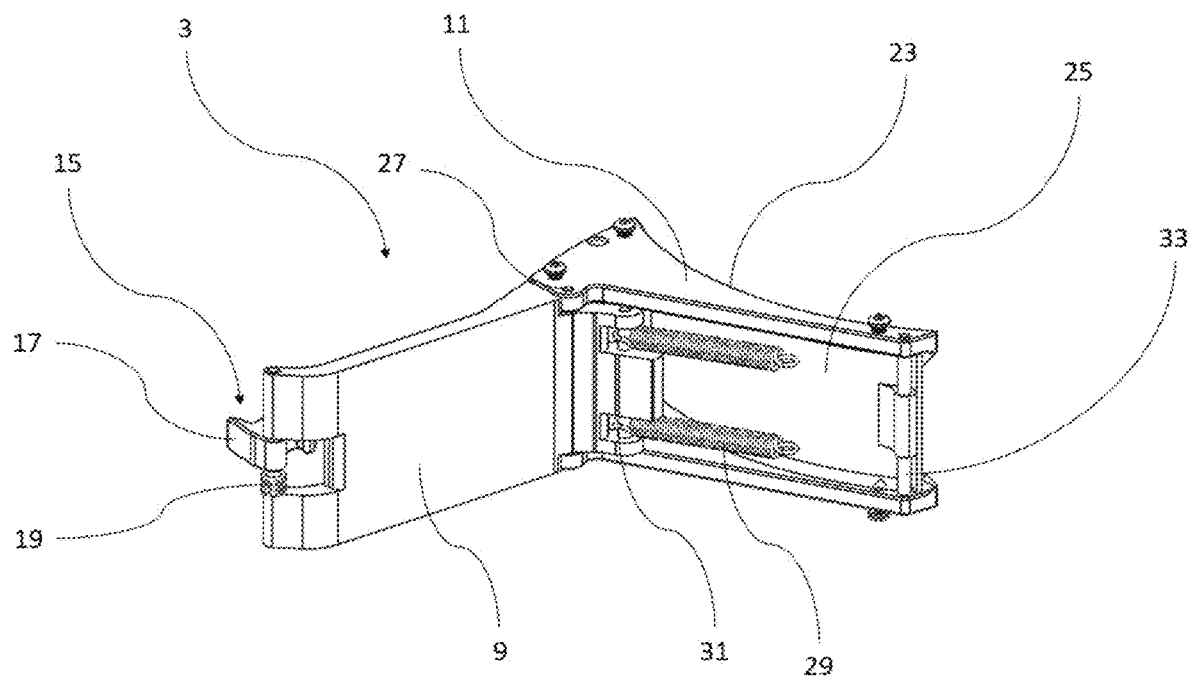

FIGS. 2-3 show detailed views of a flicker assembly 3. The flicker assembly 3 includes a flicker arm 9 and a guide wall 11. The flicker arm 9 is hingably connected to the guide wall 11 about a pin 13. The flicker arm 9 includes a pawl assembly 15. The pawl assembly 15 includes a pawl 17 and a spring 19. The pawl 17 rotates about a pin 21 and engages with a central sear latch 8. The pawl is a pivoted curved lever whose free end engages with the gear so that the gear can only turn or move one way. The guide wall 11 further includes a guide wall face 23 and a spring enclosure 25. The guide wall face 23 is an arc that shares a center of radius at the pin 13 with the flicker arm of the next corresponding flicker assembly (as best seen in FIG. 1). The spring enclosure 25 encloses at least one spring 29 that provides the force required to disperse (or flick) the munitions such that each flicker arm 9 works jointly with the guide wall face 23 of a corresponding flicker assembly to disperse a munition in a partial toroidal pattern such that the munitions dispenser disperses the munition in a toroidal pattern. In the embodiment shown, the springs 29 are connected to the flicker arm 9 at pin 31 and to the guide wall enclosure 25.

Figure 4A:
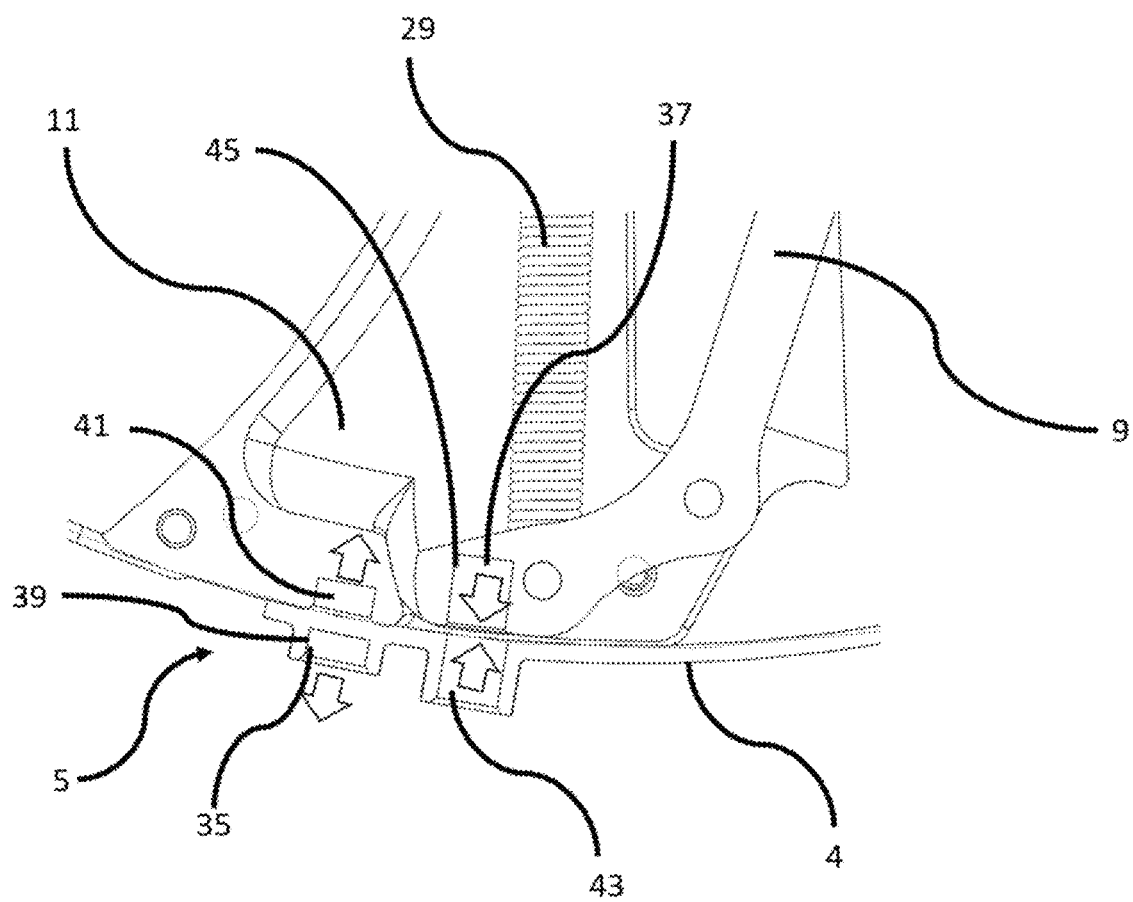
FIGS. 4A-B shows a detailed view of a door latch.
Figure 4B:
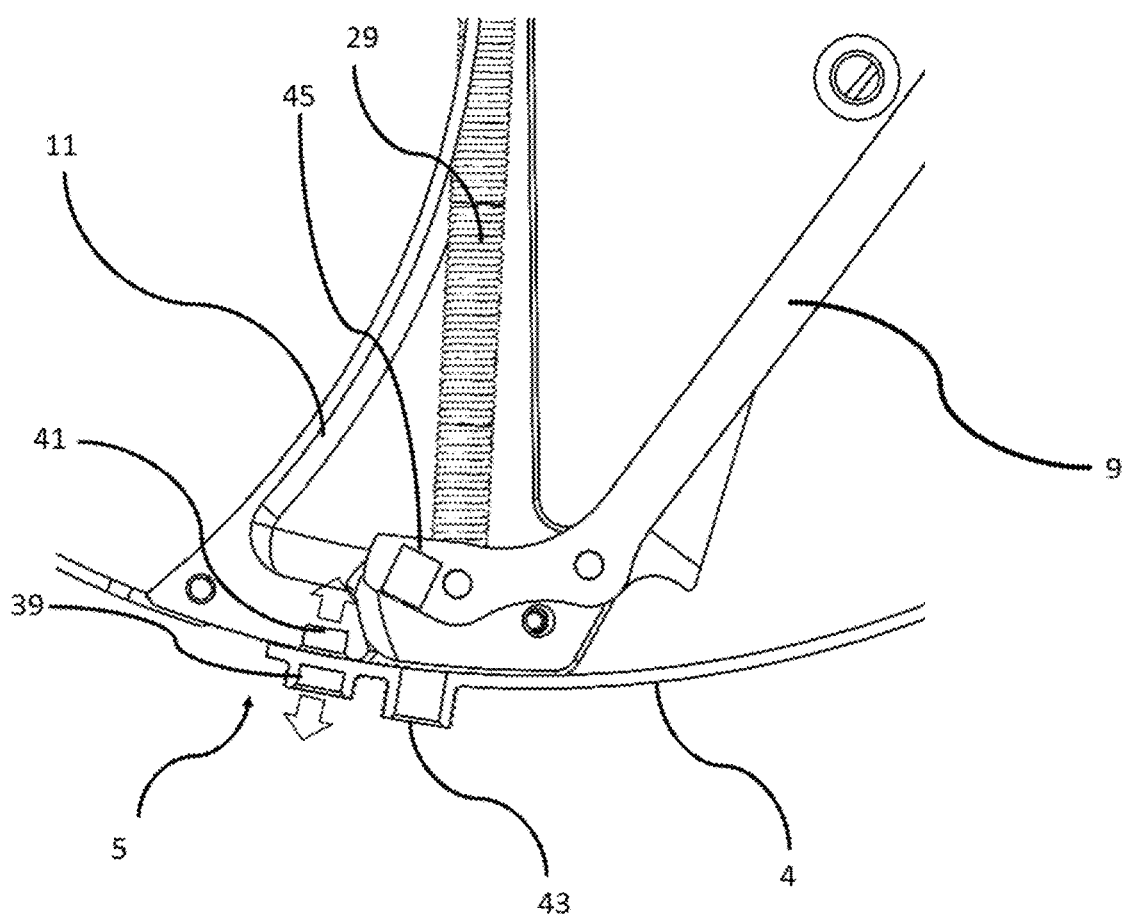

FIG. 4A-B shows a detailed view of a door latch 5. In the embodiment shown, the latch 5 is a bipolar magnetic latch that includes a first and second magnetic pair 35, 37. As shown, the first magnetic pair 35 includes a first and second magnet 39, 41 arranged to repel each other. The first magnet 39 is fixed proximate to the end of the door 4 and the second magnet 41 is fixed to the guide wall 11. The second magnetic pair 37 includes a third and fourth magnet 43, 45 arranged to attract each other. The first magnet 43 is fixed to the door 4 between the hinge 5 and the first magnet pair 35 and proximate to the first magnet pair 35. Additionally, the repelling magnetic force of the first magnetic pair 35 is weaker than the attracting magnetic force of the second magnetic pair 37 such that when the door 4 is closed the attraction of first magnetic pair 35 maintains the door closed in spite of the repelling force of the second magnetic pair 37. In contrast, once the pawl is released the spring force of the spring 29 overcomes the magnetic attraction between the third and fourth magnets 43, 45 and the repelling force of the first and second magnets 39, 41 push the door open. In some embodiments, only one pair is used, however, as shown in the figures, a plurality of pairs may be used for the attracting and/or repelling magnetic pairs.

Figure 5:
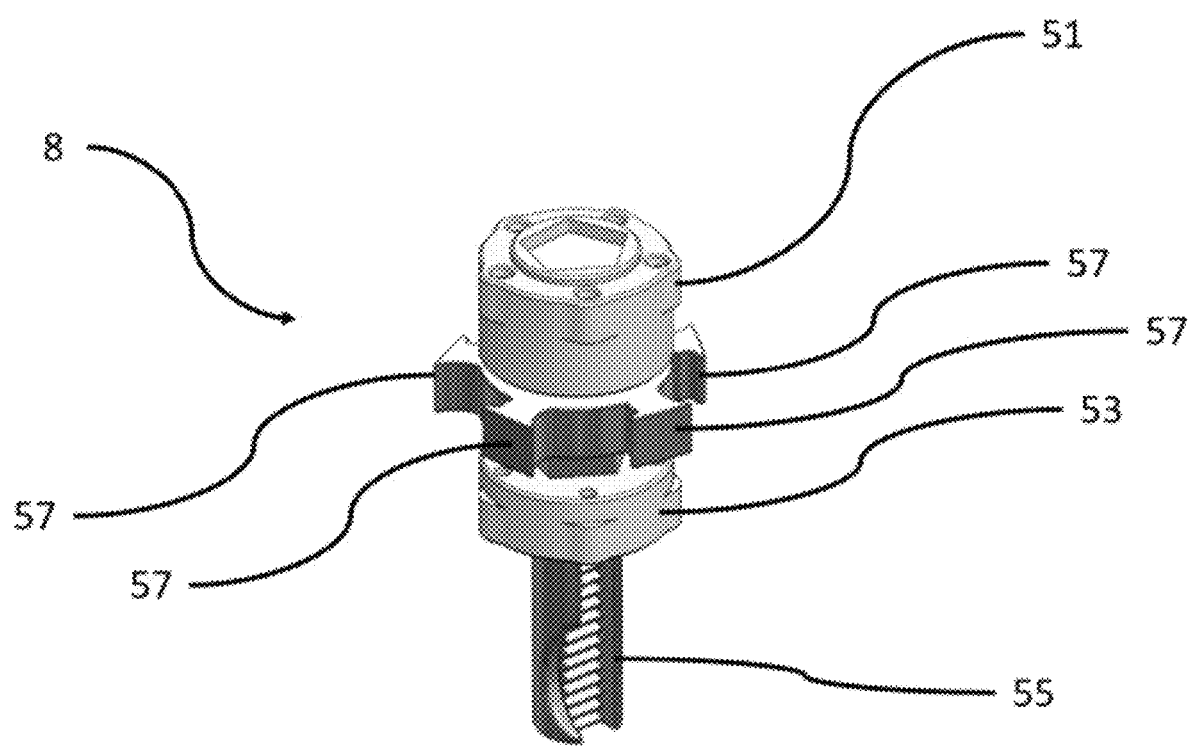
FIG. 5 shows a detailed view of the sear latch assembly.

FIG. 5 shows a detailed view of the sear latch assembly 8. The sear latch assembly 8 includes a first and second guide stop 51, 53, a gear rack 55, and a plurality of sear latches 57.

FIGS. 6A-B show the munitions dispenser in the armed position (6A) and in the dispensed position (6B). As shown in FIG. 6A, the munition dispenser 1 is in armed position with the sear latch assembly 8 in a raised position releasably connected to pawl 17. In this position, the pawl 17 holds the flicker arm 9 in the armed position. As shown in FIG. 6B, the servo motor 71 moves the sear latch assembly 8 to a position that disengages the sear latch 57 from the pawl 17 thereby engaging the springs 29 to disperse (or flick) the munitions. In the embodiment shown, the sear latch 57 is designed to release the munitions simultaneously. In other embodiments, the sear latch 57 may be designed to release the munitions sequentially.

In other embodiments, a plurality of munitions dispensers 1 can be stacked and controlled by a single servo motor 71 and sear latch assembly 8.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An apparatus comprising:
    a munitions dispenser comprising a plurality of flicker assemblies, the flicker assemblies comprising:
        a flicker arm; and
        a guide wall;
    wherein the plurality of flicker assemblies are arranged in a circular pattern.

2. The apparatus of claim 1, wherein the flicker arm rotates about a center of rotation proximate an outer circumference of the munitions dispenser.

3. The apparatus of claim 2, wherein the guide wall comprises an arc such that a first end a second flicker arm distal to the center of rotation moves along the arc.

4. The apparatus of claim 1, wherein the flicker assemblies further comprising:
    a door hingibly attached at a first end to the guide; and
    a latch at a second end of the door.

5. The apparatus of claim 4, wherein the latch further comprises:
    a bipolar magnetic latch comprising a first and second magnet pair;
    wherein the first magnetic pair is arranged to magnetically repel each other and the second magnetic pair is arranged to magnetically attract each other.

6. The apparatus of claim 1, the munitions dispenser further comprising:
    a servo motor;
    a plurality of sear latches;
    a pawl; and
    wherein the servo motor moves the plurality of sear latches to release the pawl such that the doors of each flicker assembly to be opened sequentially.

7. The apparatus of claim 1, the munitions dispenser further comprising:
    a servo motor;
    a plurality of sear latches;
    a pawl; and
    wherein the servo motor moves the plurality of sear latches to release the pawl such that the doors of each flicker assembly to be opened simultaneously.

8. The apparatus of claim 1, the flicker assembly further comprising:
    at least one spring attached to the flicker arm and the guide wall.

9. The apparatus of claim 7, further comprising a plurality of munitions dispensers stacked such that they are controlled by the servo motor.

10. The apparatus of claim 1, wherein each flicker arm works jointly with the guide wall of a corresponding flicker assembly to disperse a munition in a partial toroidal pattern such that the munitions dispenser disperses the munition in a toroidal pattern.

11. The apparatus of claim 5, wherein the magnetic force of the first magnetic pair is weaker than the attracting magnetic force of the second magnetic pair.

* * * * *